US006896179B2

(12) United States Patent
Satoh et al.

(10) Patent No.: US 6,896,179 B2
(45) Date of Patent: May 24, 2005

(54) COMPUTER SYSTEM THAT PREDICTS IMPENDING FAILURE IN APPLICATIONS SUCH AS BANKING

(75) Inventors: Makoto Satoh, Sagamihara (JP); Takashi Furuta, Tama (JP); Kuniaki Nakajima, Kawasaki (JP); Hirofumi Katoh, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 10/615,437

(22) Filed: Jul. 8, 2003

(65) Prior Publication Data

US 2004/0042472 A1 Mar. 4, 2004

(30) Foreign Application Priority Data

Jul. 9, 2002 (JP) ........................................ 2002-200005

(51) Int. Cl.[7] .............................................. G06F 17/60
(52) U.S. Cl. ....................... 235/379; 235/380; 235/385; 370/401; 370/400; 370/242; 714/100; 714/48; 714/4
(58) Field of Search ................................ 235/379, 380, 235/385; 370/401, 242, 400; 714/100, 48, 4

(56) References Cited

U.S. PATENT DOCUMENTS

| 6,249,883 B1 | * | 6/2001 | Cassidy et al. | ................ 714/42 |
| 2002/0163910 A1 | * | 11/2002 | Wisner et al. | ................ 370/389 |
| 2004/0100971 A1 | * | 5/2004 | Wray | ................ 370/400 |

* cited by examiner

Primary Examiner—Karl D. Frech
Assistant Examiner—Allyson N Trail
(74) Attorney, Agent, or Firm—John R. Pivnichny; David R. Irvin (57) ABSTRACT

To predice impending system failures, dummy messages are periodically transmitted from a surveillance computer via a message broker to a host computer that executes processes in response to electronic messages from terminals and returns an electronic message. The dummy electronic messages are time-stamped when transmitted from the surveillance computer, when received and transmitted by the message broker, and when a process is executed by the host. The surveillance computer predicts impending failures by comparing the time required while a transmitted dummy electronic message returns to the surveillance computer, a mean value of the required time, a time required while the dummy electronic message passes through the message broker, a mean value of the time for the passage, a time required for a dummy electronic message transmission between each computer and a mean value of the time for transmission to each base value.

5 Claims, 5 Drawing Sheets

| MQMD | MB header | Input APPL header 1 | Input APPL header 2 | Text |

FIG. 2B

| SAIL header | Input APPL header 1 | Input APPL header 2 | Text |

FIG. 2C

| SAIL header | Output APPL header 1/2 | Text |

FIG. 2D

| MQMD | MB header | Output APPL header 1/2 | Text |

COMPUTER SYSTEM THAT PREDICTS IMPENDING FAILURE IN APPLICATIONS SUCH AS BANKING

FIELD OF THE INVENTION

The present invention relates to a computer system, and in particular to a computer system including a processing computer that performs a predetermined process according to an electronic message received from a terminal and sends back an electronic message to the sender of the electronic message.

BACKGROUND

Automatic Teller Machines (ATMs), which were introduced in order to save labor and ease congestion at the counter at banks, have become widely used as they have increased in numbers and improved in level of service. Typically, an ATM is connected on-line, in some cases through an intermediary communicator known as a message broker, to a host computer. The ATM sends and receives electronic messages to and from the host computer to cause the host computer to perform banking transactions specified by users, such as deposits, withdrawals, bookkeeping, and finds transfer, and to perform actions such as dispensing cash and displaying or printing the results of transactions.

ATMs do not respond properly to commands provided by users if they cannot receive messages sent from the host computer due to failure in the host computer. Therefore, if failure occurs in the host computer, the failure must be immediately detected and fixed, or other countermeasures must be taken.

A technology for monitoring the operating status of a computer located in a remote location and connected over a communication line is disclosed in Published Unexamined Patent Application No. 2001-318840. In that technology, an operation-surveillance computer in a computer network sends electronic mail to a monitored computer for determining the monitored computer's operating status based on whether the surveillance computer receives an electronic mail reply from the monitored computer within a predetermined period of time.

Published Unexamined Patent Application No. 8-314762 discloses a technology in which a monitored computer sends a message to a surveillance computer at regular intervals and, if the message does not arrive within a predetermined period of time, the surveillance computer determines that an error has occurred and activates an alarm device.

Requests for banking transactions tend to concentrate in a certain period of time. A failure that occurs during a busy period may severely affect operations at the banking institution. The technologies described in Published Unexamined Laid-Open Patent Applications No. 2001-318840 and No. 8-314762 determine that failure has occurred in a computer system if information such as mail or a message does not arrive at the estimated time at which it should otherwise arrive. These technologies do not enable prediction of failure. Therefore, although the failure in a computer system of a banking institution can be detected by using these technologies, it is difficult to prevent impairment of operations in the banking institution due to the failure.

An object of the present invention is to provide a computer system that can predict the failure.

SUMMARY

The present invention includes a computer system comprising a processing computer for executing a predetermined process in response to an electronic message received from a terminal and for returning an electronic message to the sender of the original electronic message, a message broker for relaying electronic messages being transferred between the terminal and the processing computer, and a surveillance computer connected to the message broker via a telecommunication circuit. The computer system further comprisies: transmission means for periodically transmitting dummy electronic messages from the surveillance computer, the dummy electronic messages being transmitted from the surveillance computer to the processing computer via the message broker and then being returned from the processing computer to the surveillance computer via the message broker; a recording means for marking time information; and an error prediction means for making a storing means of the surveillance computer store time information marked on a dummy electronic message being returned to the surveillance computer from the processing computer via the message broker, and for predicting an error occurrence in the computer system based on the round trip time for the dummy electronic message compared with a mean value of the round trip time.

The computer system of the present invention comprises a processing computer for executing a predetermined process, for example a process relating to operations of a banking institution, in response to an electronic message received from a terminal, for example a terminal or an ATM of the banking institution, or a terminal installed in a branch office of the banking institution, and returns an electronic message to the sender of the original electronic message; a message broker for relaying an electronic message transmitted between the terminal and the processing computer; and the surveillance computer connected with the message broker through a telecommunication circuit.

The dummy electronic message may be sent at regular intervals from the surveillance computer to the processing computer through the message broker and returned from the processing computer to the surveillance computer. The recording means records time information representing the current time in the dummy electronic message when the dummy electronic message is received at the message broker, when transmitted from the message broker, and/or when a process based on the dummy electronic message is performed at the message broker.

If failure occurs in the computer system, the dummy electronic message sent by the surveillance computer at regular intervals as described as above is not returned, or the time elapsed between the transmission of the dummy electronic message by the surveillance computer and the reception of the dummy electronic message sent back to the surveillance computer exceeds a threshold. If no failure occurs but a pre-failure phenomenon that can cause failure instead occurs (such as a delay in processing due to line congestion or a bug encountered in a program being executed in the message broker or the processing computer), the elapsed time described above does not exceed the threshold, but the mean elapsed time value increases as the elapsed time along the entire length of the line increases.

Thus, the error prediction means of the present invention stores the time information recorded in the dummy electronic message returned from the processing computer to the surveillance computer through the message broker in the storage means of the surveillance computer, and predicts failure in the computer system by comparing the time elapsed between the transmission of the dummy electronic message by the surveillance computer and the reception of the returned dummy electronic message at the surveillance computer with the mean values of the elapsed times.

Using the time elapsed between transmission of the dummy electronic message from the surveillance computer and the reception of the returned dummy electronic message at the surveillance computer and also the mean elapsed time enables the detection of not only failure actually occurring in the computer system but also a phenomenon that can cause failure in the computer system when an increase in the mean elapsed time is detected in a pre-failure stage. That is, failure in the computer system can be predicted.

The time information recorded by the recording means in the dummy electronic message is stored. Therefore, a location in which a phenomenon that can cause failure can be identified by referring to the stored time information and therefore the phenomenon that can cause failure can be readily corrected. Thus, according to the present invention, failure can be predicted. Applying the present invention to a computer system of a banking institution can avoid failure in the system and therefore serious obstacles to operations of the banking institution.

The dummy electronic message preferably has the same format as that of electronic messages sent from terminals, and predetermined items of information are set in predetermined fields of the message. This allows the message broker and the processing computer to apply the same processes to the dummy electronic message they received as they apply to the electronic messages sent from the terminals (by using the same program) while they are performing a process referring to specific items of information in the dummy electronic message. Thus, a phenomenon that can cause failure can be detected reliably, and failure can therefore be predicted more reliably.

If a plurality of computers are provided as the processing computer in the present invention, the transmission means preferably sends the dummy electronic message to each of the plurality of processing computers. This allows failure in each of the plurality of processing computers to be predicted.

The error prediction means in the present invention preferably calculates the time elapsed between the transmission and reception of the dummy electronic message and the mean elapsed time in each of the segments between the surveillance computer and the message broker and between the message broker and the processing computer on the basis of the time information stored in the storage means of the surveillance computer, and uses the calculated elapsed time and mean elapsed time in each segment to predict failure in the computer system.

Thus, if a phenomenon occurs that little affects the time elapsed between the transmission of the dummy electronic message from the surveillance computer and the reception of the dummy electronic message sent back, but can cause failure in the segment between the surveillance computer and the message broker or in the segment between the message broker and the processing computer, the phenomenon can be detected, and therefore failure can be more reliably detected.

In the present invention, the recording means preferably records time information in the dummy electronic message when it is received at, and transmitted from, the message broker. The error detection means preferably calculates the time elapsed between the reception and the transmission of the dummy electronic message by the message broker and the mean value of the elapsed times and uses them to predict failure in the computer system.

Thus, if a phenomenon occurs that marginally affects the time elapsed between the transmission of the dummy electronic message from the surveillance computer and the reception of the dummy electronic message sent back, but can cause failure in message broker, such as a delay in processing due to a bug encountered in a program being executed in the message broker, the phenomenon can be detected, and therefore failures can be predicted more reliably.

DETAILED DESCRIPTION

An embodiment of the present invention will be described with reference to the accompanying drawings. While numeric values which do not affect the present invention will be provided in the following description, the present invention is not limited to them.

Figure 1:
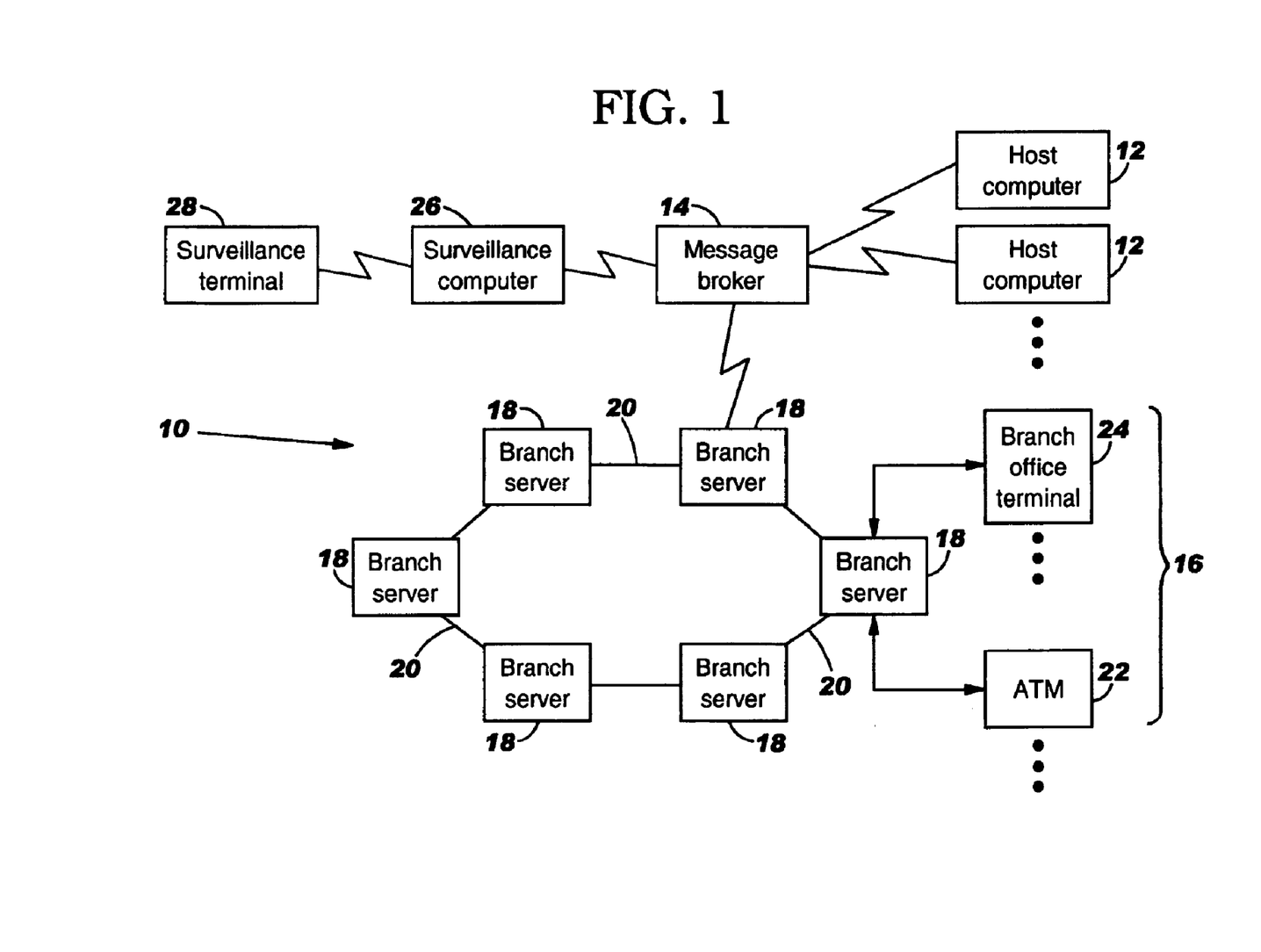
FIG. 1 is a block diagram schematically showing a configuration of a computer system according to an embodiment of the present invention.

FIG. 1 shows a computer system 10 installed in a banking institution according to the embodiment. The computer system 10 comprises a plurality of host computers 12 provided in an information center of the banking institution for performing a variety of processes in the banking institution, a computer network 16 built in the banking institution, a message broker 14 for relaying electronic messages between each host computer 12, and the computer network 16.

The computer system 10, the host computes 12, and the message broker 14 are equivalent to a computer system, processing computer, and a message broker, respectively, according to the present invention.

Each of the host computers 12 may be a general-purpose mainframe computer comprising a CPU, storage, and input/output ports interconnected through a bus, and also comprising a communication controller and input/output devices such as a magnetic disk drive connected to the input/output ports, which are not shown. The host computer 12 is connected to the message broker 14 through a channel. Host processing programs are installed on the magnetic disks in each host computer 12 for performing processes concerning different operations in the banking institution.

The message broker 14 may be a general-purpose mainframe computer comprising a CPU, storage, and input/output ports interconnected through a bus, and also comprising a communication controller and input/output devices such as a magnetic disk drive connected to the input/output ports. The message broker 14 is connected to the host computers 12 through channels and also connected to the computer network 16 (in particular, to branch servers 18 in the network 16) through a communication line connected to the communication controller, which are not shown. Message broker processing programs are installed on the magnetic disk in the message broker 14 for performing predetermined processes such as the relay of electronic messages.

In the computer network 16, the branch servers 18 (which may be any of a PC, workstation, and mainframe computer)

provided in the branch offices of the banking institution are interconnected through a communication line 20. A plurality of ATMs (Automatic Teller Machines) 22 and a plurality of branch office terminals (operated by employees of the banking institution) 24 are installed in each branch office and connected to the branch server 18 installed in that branch office.

The ATM 22 can be loaded with bank cards owned by customers who have accounts in the banking institution, and includes a card reader that can read information magnetically recorded on the bank cards. The bank office terminal 24 can be loaded with bankbooks owned by customers who have accounts in the banking institutions, and includes a bookkeeping device attached to it that can read information magnetically recorded on bankbooks and can also record given information in the bankbooks. The ATMs 22 and the branch office terminals 24 are equivalent to terminals according to the present invention.

A surveillance computer 26 is connected to the message broker 14 through a communication line. The surveillance computer 26 may be a PC comprising a CPU, a ROM, a RAM, and input/output ports that are interconnected through a bus, and also comprising a communication controller and input/output devices such as a display, a mouse, a keyboard, an HDD, and a CD-ROM drive that are connected to the input/output ports. The surveillance computer 26 is connected to the message broker 14 and the surveillance terminal 28 through a communication line connected to the communication controller. Installed on the HDD in the surveillance computer 26 are surveillance computer programs, including a dummy message sending program for performing a dummy message send interrupt process and a dummy message receiving program for performing a dummy message receive interrupt handling.

First, among the operations of the present embodiment, exchange of electronic messages between the ATMs 22 and the branch office terminals 24 and the host computer 12 will be described below. A customer of a banking institution who wants to perform a certain banking transaction (for example, a withdrawal or funds transfer) visits a place where ATMs 22 of the banking institution are installed, selects the banking transaction on an initial screen (on which available banking transactions are listed on a menu) of an ATM 22, inserts his or her bank card in the card reader of the ATM 22, and enters a personal identification number (PIN) associated with his or her account through a touch panel provided on the ATM 22. This causes the ATM 22 to read the number of the account magnetically recorded on the inserted bank card.

If a customer who wants to perform a banking transaction brings his or her bankbook and personal seal instead of a bank card to a branch office of the banking institution, he or she fills out a form for requesting the banking transaction, puts the seal on it, and hands it with the bankbook to a teller at the branch office to request the banking transaction. In that case, the employee of the banking institution operates the keyboard of a branch office terminal 24 to select the banking transaction to be performed and inserts the bankbook in a bookkeeping device of the branch office terminal 24. Then the customer's account number is read from the bankbook and the seal on the form is checked against a registered seal impression identified by the bankbook to determine whether the customer requesting the banking transaction is an authorized customer.

In either case, if the customer requesting the banking transaction is validated as an authorized user, the ATM 22 or the branch office terminal 24 displays a transaction specification entry screen for entering specification for the banking transactions to be performed and prompts the user to enter transaction specifications. The customer or the employee of the banking institution enters transaction specifications (for example, information for identifying a transfer account and the amount of money to be transferred) by using the touch panel of the ATM 22 or the keyboard of the branch office terminal 24.

When the transaction specification is entered through the ATM 22 or the branch office terminal 24, the ATM 22 or the branch office terminal 24 edits the information indicating the transaction specifications entered, information indicating the banking transaction to be executed, and the account number that is read from the bank card or the bankbook (and the PIN entered through the touch panel of the ATM 22) into an electronic message, and the electronic message is sent to issue an instruction for execution of the banking transaction requested by the user.

Figure 2A:
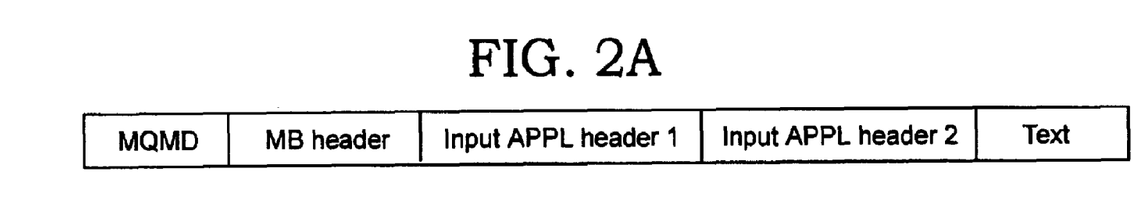
FIG. 2 is a schematic diagram of an exemplary format of a dummy electronic message.
Figure 2B:
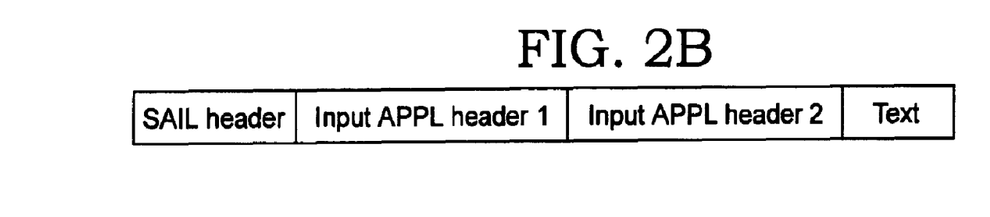

The electronic message is sent from the ATM 22 or the branch office terminal 24 to the message broker 14 through the branch server 18. FIG. 2(A) shows an example of the format of the electronic message sent from the branch server 18 to the message broker 14. The message broker 14 refers to the header section of the electronic message ("MQMD" and "MB Header" shown in FIG. 2(A)), determines a host computer 12 (the host computer 12 that executes processes concerning the banking transaction specified in the electronic message) to which the message is to be sent on the basis of information in the header, modifies the header section of the message for transmission to the host computer 12 (replaces the "MQMD" and "MB header" with an "SAIL header"), and sends it to the destination host computer 12.

Figure 2C:
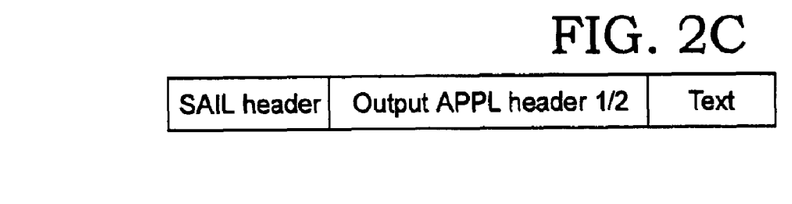

When receiving the electronic message, the host computer 12 refers to the message and, if the source of the message is the ATM 22, checks the PIN (the PIN entered by the customer through the touch panel of the ATM 22) included in the electronic message against a registered PIN to determine whether the operator of the ATM 22 is authorized. The host computer 12 also obtains the information about the specified banking transaction from the electronic message and executes the specified banking transaction. After the completion of the execution of the banking transaction, the host computer 12 generates an electronic message (completion notice) indicating the completion of the banking transaction and sends it back to the message broker 14. FIG. 2(C) shows the format of the message sent back from the host computer 12 to the message broker 14.

Figure 2D:
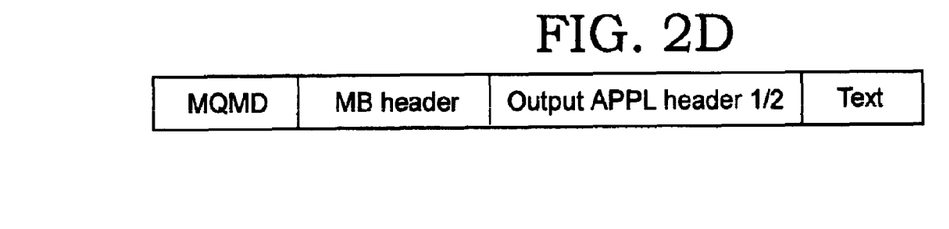

When receiving the electronic message sent back from the host computer 12, the message broker 14 refers to the header of the electronic message (the "SAIL header" shown in FIG. 2(C)) it received to determine the destination of the message, modifies the header of the electronic message (replaces the "SAIL header" with the "MQMD" and the "MB header" as shown in FIG. 2(D)), and sends the message to the destination through the branch server 18. When the ATM 22 or the branch office terminal 24, that is the sender of the original electronic message, receives the electronic message through the branch server 18, the ATM 22 or the branch office terminal 24 displays a transaction completion screen. This informs the customer that the transaction has been completed.

Figure 3:
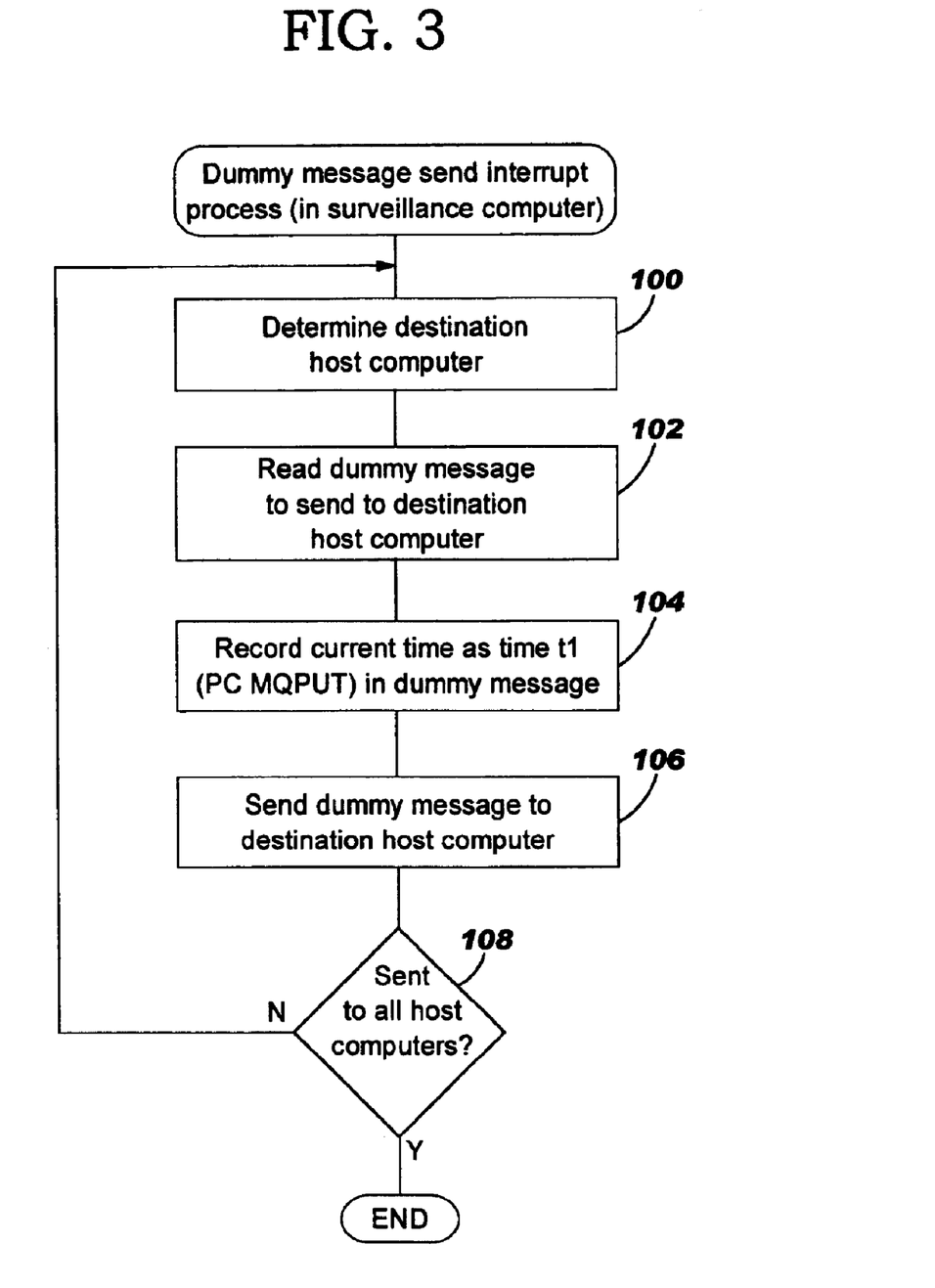
FIG. 3 is a flowchart of a dummy electronic message send interrupt process.

A dummy electronic message send interrupt process in which a dummy electronic message sending program is executed by the CPU of the surveillance computer 26 will be described below with reference to a flowchart shown in FIG. 3. The dummy electronic message send interrupt process is repeated at predetermined intervals at which an interruption occurs in the surveillance computer 26 (for example every 30 seconds). The dummy electronic message send interrupt process corresponds to transmission means of the present invention (in particular the transmission means).

In the dummy electronic message send interrupt process, a dummy electronic message is sent to the plurality of host computers 12 in sequence. First at step 100, a host computer 12 to which the dummy electronic message is to be sent is determined. Dummy electronic message information representing the dummy messages to be sent to the host computers 12 is stored in the HDD of the surveillance computer 26 according to the present embodiment. At step 102, the dummy electronic message to be sent to the destination host computer 12 determined at step 100 is read from the HDD.

The dummy electronic message may have the same format as that of the electronic message sent from the branch server 18 to the message broker 14 (see FIG. 2(A)). In the message, predetermined information (which is not ordinarily included in other messages) indicating that this message is a dummy is preset in a predetermined field of the message so that the message broker 14 and the host computer 12 can recognize the received message as a dummy.

In particular, characters "M0" are set in a "Delivery channel type" field in the MB header of the dummy electronic message. A character "Z" is set in the "Message type" field in the MB header and in the "Message type" in the "Input APPL header 1". A number "9700777" is set in the "TC/Server setting branch code," "Branch code," and "Transaction account branch code" fields in the Input APPL header 1 and "Transaction branch code" field in the "Input APPL header 2". A number "000" is set in the "Operator number" and "Auditor number" field in the "Input APPL header 1". A number "0001" is set in the "Terminal Transaction serial number" field in the Input APPL header 1 and a number "9999999" is set in the "Customer number " in the "Input APPL header 1 " and "Transaction account number" in the Input APPL header 2.

At step 104, the current time is obtained and recorded as dummy electronic message send time t1 (See "PC MQPUT" in FIG. 4) in the "Text" field of the dummy electronic message read at step 102. Step 104 corresponds to recording means of the present invention. At step 106, the dummy electronic message which is destined for the destination host computer 12 and in which the dummy electronic message send time t1 is recorded is sent to the message broker 14.

At step 108, the surveillance computer 26 determines whether the dummy electronic message has been sent to all of the host computers 12. If the determination is negative, then the process returns to step 100 and steps 100 to 106 are repeated. In this way, the dummy message is sent to all the host computers 12. After the dummy electronic message is sent to all the host computers 12, the determination at step 108 will be positive and the dummy electronic message send interrupt process will end.

The dummy electronic message sent from the surveillance computer 26 is received by the message broker 14 first, which examines the message. When the message broker 14 recognizes that the electronic message is a dummy on the basis of the information set in the "Message type" field and other fields in the MB header, it records the current time as the dummy message receive time t2 (see "MB MQGET" in FIG. 4) in the "Text" field of the dummy message it received.

The message broker 14 also records the current time as dummy electronic message send time t3 (see "MB SEND" in FIG. 4) in the "Text" field of the dummy electronic message after it determines the host computer 12 that is the destination of the dummy message and modifies the header of the message as described above. This recording step corresponds to the process of recording the time t2 on receiving the dummy message and to the recording means of the present invention. The message broker 14 sends the dummy electronic message in which the time t3 is recorded to the destination host computer 12.

The host computer 12 queues electronic messages it receives, then retrieves the messages from the queue in the order in which it received them for processing. Accordingly, the dummy electronic message sent from the message broker 14 and received by the host computer 12 is also queued. The host computer 12 retrieves the electronic message from the queue and examines it. When the host computer 12 recognized that the message is a dummy on the basis of the information in the "Message type" field and other fields of the Input APPL header 1, it records the current time as dummy electronic message processing time t4 (see "B/E" in FIG. 4) in the "Text" field of the dummy message. This process corresponds to the recording means of the present invention.

Then, the host computer 12 generates a dummy electronic message which may have the same format as that of a regular completion notice message (the format shown in FIG. 2(C)) on the basis of the dummy electronic message retrieved from the queue. Like the dummy message sent by the surveillance computer 26, this dummy message includes predetermined information indicating that this is a dummy in a predetermined field of the message. Specifically, a character "Z" is set in the "Message type" field of the "Output APPL header 1/2" and a number "9700777" is set in the "TC/server setting branch code" field and the "Branch code" field in the dummy message sent by the host computer 12. In the "Text" field of this dummy message, the "Text" field included in the dummy electronic message retrieved from the queue is included as is. The host computer 12 sends the generated dummy electronic message to the message broker 14.

The dummy message sent from the host computer 12 is received by the message broker 14. When the message broker 14 recognizes that the electronic message is a dummy on the basis of the information in the electronic message it received, it records the current time as dummy electronic message receive time t5 (see "MB RECEIVE" in FIG. 4) in the "Text" field of the dummy electronic message it received.

Figure 4:
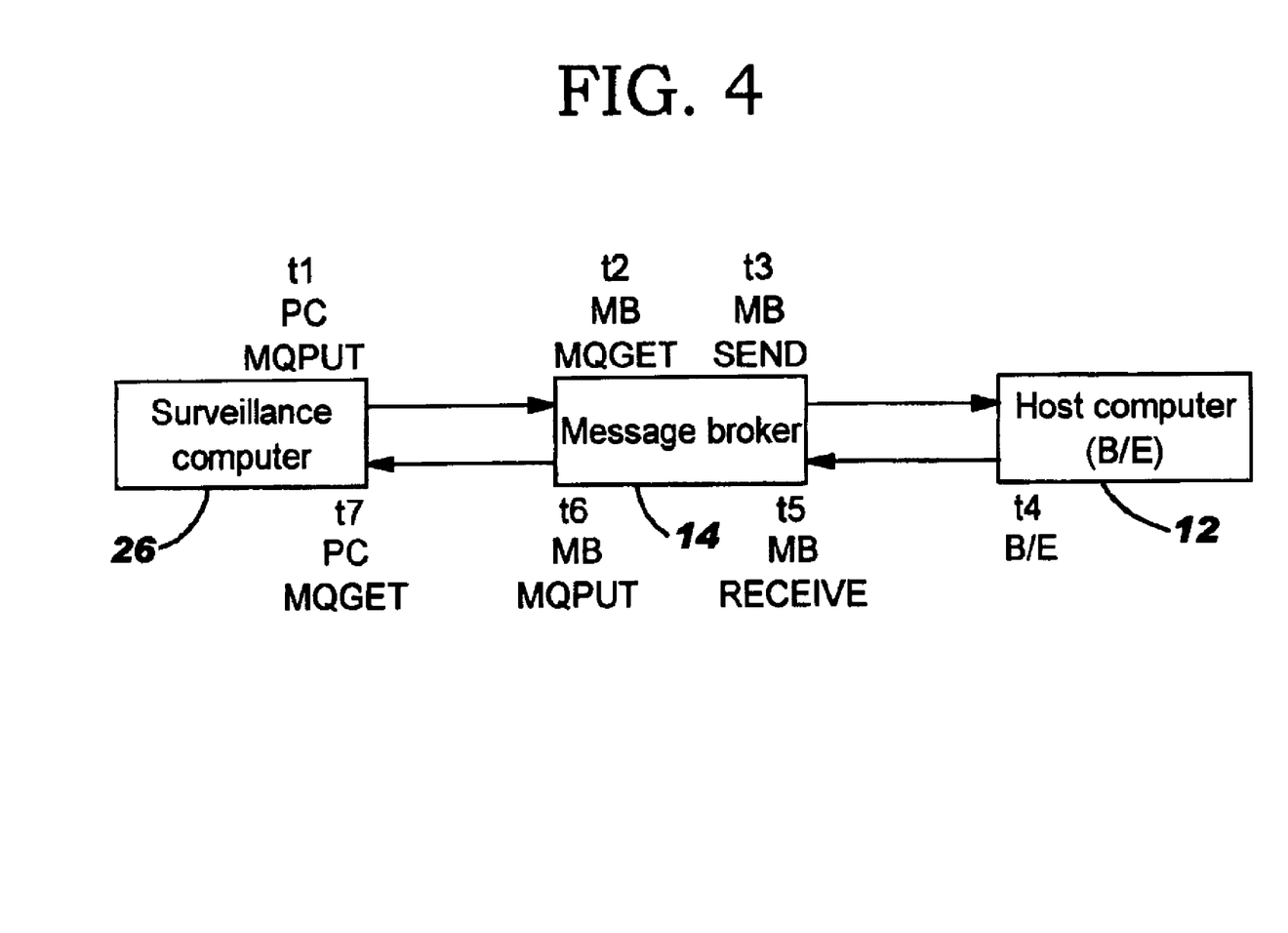
FIG. 4 is a conceptual diagram of segments in which time is measured on the basis of the dummy electronic message.

The message broker 14 determines the destination of the dummy electronic message (the surveillance computer 26 this time) and performs steps such as modification of the header of the dummy message, then records the current time as dummy electronic message send time t6 (see "MB MQPUT" in FIG. 4). This recording step as well as the step of recording the time t5 on the dummy message reception corresponds to the recording means of the present invention. It sends the dummy electronic message in which the time t6 is recorded to the surveillance computer 26.

When the surveillance computer 26 receives the dummy electronic message, an interruption occurs in the surveillance computer 26 and a dummy electronic message receiving program is executed in the CPU to perform a dummy electronic message receive interrupt process in the surveillance computer 26. The dummy electronic message receive interrupt process will be described with reference to a flowchart in FIG. 5.

Figure 5:
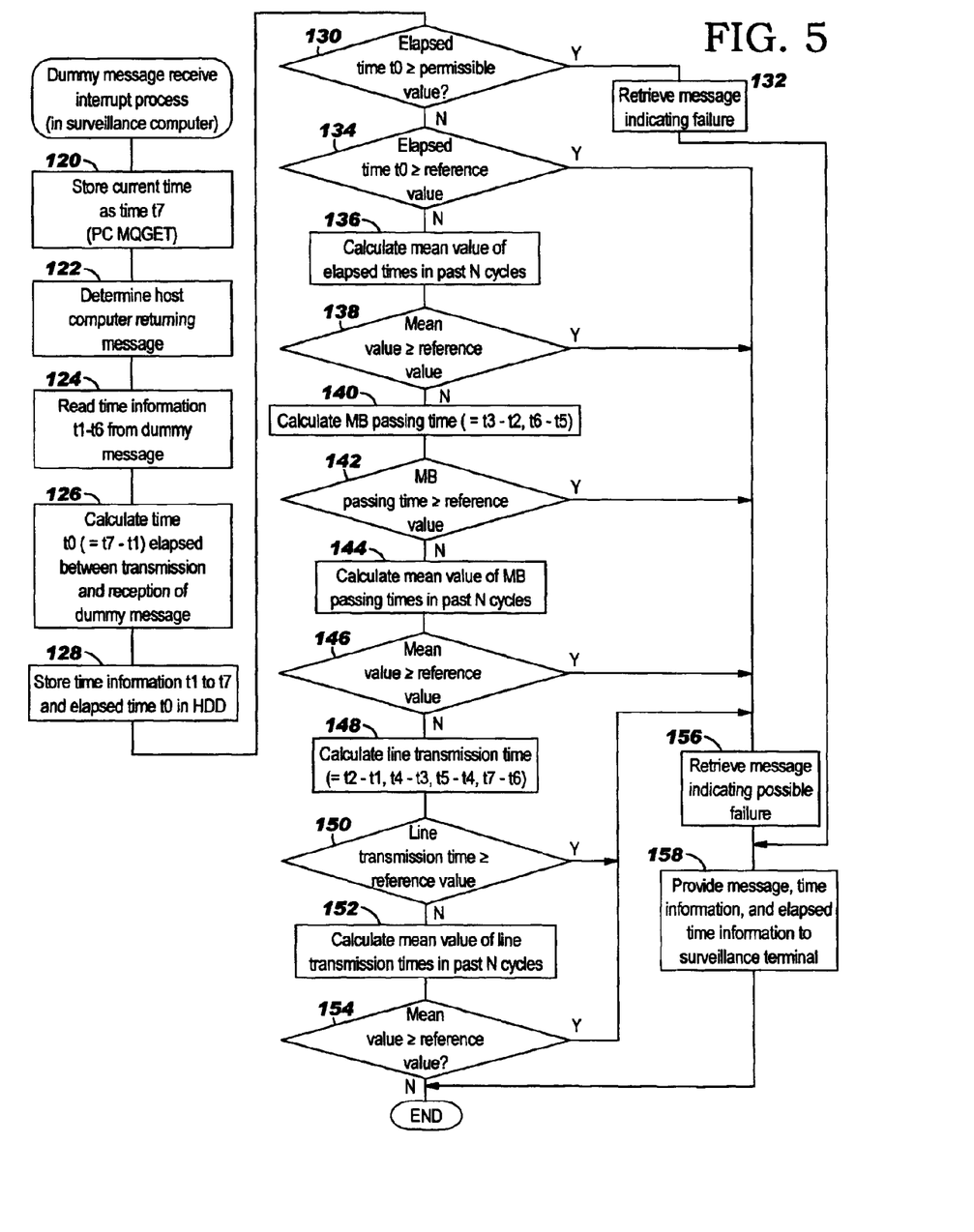
FIG. 5 is a flowchart of a dummy electronic message receive interrupt process.

At step 120, the surveillance computer 26 stores the current time as dummy electronic message receive time t7 (see "PC MQGET" in FIG. 4). Then at step 122, it refers to the dummy electronic message to determine the host computer 12 from which the dummy electronic message has been sent. At step 124, the surveillance computer 26 reads time information t1 to t6 set in the "Text" field of the dummy electronic message. Then at step 126, it subtracts t1 (the time the dummy electronic message is sent from the surveillance computer 26) included in the time information it read from time t7 (the time the dummy electronic message is received at the surveillance computer 26) stored in memory to obtain time t0 elapsed between the transmission of the dummy message by the surveillance computer 26 and reception of the message by the surveillance computer 26.

At step 128, the surveillance computer 26 stores the time information t1 to t6 read from the received dummy electronic message, the time information t7 stored in memory, and the elapsed time t0 obtained at step 126 in the HDD as time information concerning the host computer 12 determined as the source of the dummy message sent. As described above, the dummy electronic message is sent to all the host computers 12 at regular intervals and the dummy electronic message receive interrupt process is performed each time the dummy electronic message is sent back from one of the host computers 12. Thus, the dummy electronic message receive interrupt process is repeated and time information for each host computer 12 as provided in Table 1, below, is stored in the HDD of the surveillance computer 26 over time.

Table 1, below, shows exemplary time information.

determined whether the elapsed time t0 obtained at step 126 is greater than or equal to a predetermined reference value, to determine whether or not any phenomenon that can cause failure has occurred in the computer system 10. The reference value may be, for example, a value (less than the permissible value described above: 0.5 seconds or so, for example) equivalent to time to that would elapse between transmission and reception in a stage at which a phenomenon that can cause failure has occurred but the failure has not occurred yet. If the determination is positive, it can be determined that a phenomenon that can cause failure is likely to have occurred in the computer system 10. Consequently, the process proceeds to step 156.

On the other hand, if the determination at step 134 is negative, then the process proceeds to step 136, where time information stored in the past N cycles associated with the host computer 12 determined at step 122 as the sender of the dummy electronic message is referenced to among the time information associated with the host computers 12 that is stored in the HDD to calculate the mean value of elapsed times to in the past N cycles. Then, at step 138, it is determined whether or not the mean value of the elapsed times t0 is greater than or equal to a reference mean value. The reference mean value may be a value less than the reference value for elapsed time t0, for example, 0.3 seconds or so. If the determination is positive, a phenomenon that can cause failure is likely to have occurred in the computer system 10. Consequently, the process proceeds to step 156.

On the other hand, if the determination at step 138 is negative, the process proceeds to step 140, where time elapsed between receiving of the dummy electronic message

| PC | MB | | | MB | | PC | End to End |
|---|---|---|---|---|---|---|---|
| MQPUT(a) | MQGET | SEND | B/E | RECEIVE | MQPUT | MQGET(b) | Resp(b–a) |
| 10:24:43.75 | 10:24:43.97 | 10:24:43.97 | 10:24:44.00 | 10:24:44.01 | 10:24:44.01 | 10:24:44.10 | 0:00:00.35 |
| 10:24:44.00 | 10:24:44.04 | 10:24:44.04 | 10:24:44.08 | 10:24:44.10 | 10:24:44.10 | 10:24:44.15 | 0:00:00.15 |
| 10:24:44.01 | 10:24:44.04 | 10:24:44.04 | 10:24:44.09 | 10:24:44.10 | 10:24:44.11 | 10:24:44.37 | 0:00:00.36 |
| 10:24:44.01 | 10:24:44.04 | 10:24:44.04 | 10:24:44.10 | 10:24:44.12 | 10:24:44.12 | 10:24:44.39 | 0:00:00.38 |
| 10:24:44.04 | 10:24:44.04 | 10:24:44.06 | 10:24:44.13 | 10:24:44.19 | 10:24:44.19 | 10:24:44.58 | 0:00:00.54 |
| 10:24:54.10 | 10:24:54.47 | 10:24:54.47 | 10:24:54.51 | 10:24:54.55 | 10:24:54.55 | 10:24:54.86 | 0:00:00.76 |
| 10:24:54.10 | 10:24:54.47 | 10:24:54.47 | 10:24:54.51 | 10:24:54.55 | 10:24:54.55 | 10:24:54.87 | 0:00:00.77 |
| 10:24:54.10 | 10:24:54.47 | 10:24:54.47 | 10:24:54.52 | 10:24:54.56 | 10:24:54.56 | 10:24:54.87 | 0:00:00.77 |
| 10:24:55.21 | 10:24:55.48 | 10:24:55.48 | 10:24:55.49 | 10:24:55.51 | 10:24:55.51 | 10:24:55.59 | 0:00:00.38 |
| 10:24:55.25 | 10:24:55.48 | 10:24:55.48 | 10:24:55.76 | 10:24:55.87 | 10:24:55.87 | 10:24:56.00 | 0:00:00.75 |
| 10:24:55.40 | 10:24:55.53 | 10:24:55.53 | 10:24:55.80 | 10:24:55.97 | 10:24:55.97 | 10:24:56.01 | 0:00:00.61 |
| 10:25:13.64 | 10:25:13.97 | 10:25:13.97 | 10:25:14.00 | 10:25:14.01 | 10:25:14.01 | 10:25:14.13 | 0:00:00.49 |
| 10:25:13.98 | 10:25:14.05 | 10:25:14.05 | 10:25:14.06 | 10:25:14.08 | 10:25:14.08 | 10:25:14.19 | 0:00:00.21 |

Step 130 and the subsequent steps correspond to failure prediction means of the present invention. At step 130, it is determined whether or not the elapsed time t0 obtained at step 126 exceeds a predetermined permissible value, to determine whether a failure has occurred in the computer system 10. The permissible value may be a value equivalent to time t0 elapsed when some failure obviously occurred in the computer system 10, for example. If the elapsed time t0 is greater than or equal to the permissible value, it can be determined that the failure has occurred in the computer system 10. Therefore, the determination at step 126 is positive, and the process proceeds to step 132, where message information is read from the HDD that represents a message for indicating the failure to the operator of a surveillance terminal. Then the process proceeds to step 158.

On the other hand, if the determination at step 130 is negative, the process proceeds to step 134, where it is and sending of the message by the message broker (MB) 14 ("passing time"), that is, each of (t3–t2) and (t6–t5), is calculated from the time information stored in the HDD at step 128. Then, at step 142, it is determined whether or not the message broker 14 passing time calculated at step 140 is greater than or equal to a reference passing time value. The reference passing time value may be 0.05 seconds or so, for example. If the determination is positive, a phenomenon that can cause failure is likely to have occurred in the computer system 10. Consequently, the process proceeds to step 156.

On the other hand, if the determination at step 142 is negative, then the process proceeds to step 144, where the mean value of message broker 14 passing times in the past N cycles is calculated. Then at step 146, it is determined whether or not the mean value of the message broker 14 passing times calculated at step 144 is greater than or equal to a reference mean passing time value. The reference mean passing time value may be a value less than the reference passing time value, for example 0.03 seconds. Again, if this determination is positive, a phenomenon that can cause failure is likely to have occurred in the computer system 10. Consequently, the process proceeds to step 156. Steps 142 and 144 correspond to the failure prediction means.

On the other hand, if the determination at step 146 is negative, then the process proceeds to step 148, where time elapsed between the transmission of the dummy electronic message by the surveillance computer 26 and the reception of the message by the message broker 14 (=t2−t1), time elapsed between the transmission of the dummy electronic message by the message broker 14 and the reception of the message by the host computer 12 (=t4−t3), time elapsed between the transmission of the dummy message by the host computer 12 and the reception of the message by the message broker 14 (=t5−t4), and time elapsed between the transmission of the dummy message by the message broker 14 and the reception of the message by the surveillance computer 26 (=t7−t6) are calculated from the time information stored in the HDD at step 128.

Then at step 150, it is determined whether or not each of the times calculated at step 148 (hereinafter referred to as line transmission time) is greater than or equal to a line transmission time reference value. The line transmission time reference value may be 0.1 seconds, for example. If the determination is positive, a phenomenon that can cause failure is likely to have occurred in the computer system 10. Consequently, the process proceeds to step 156.

On the other hand, if the determination at step 150 is negative, the process proceeds to step 152, where time information stored in the past N cycles associated with the host computer 12 that has been determined at step 122 as the sender of the dummy message sent back is referred to among the time information associated with the host computers 12 stored in the HDD to calculate the mean values of line transmission times of the segments between the surveillance computer 26 and the message broker 14, between the message broker 14 and the host computer 12, between the host computer 12 and the message broker 14, and between the message broker 14 and the surveillance computer 26 in the past N cycles.

Then at step 154, it is determined whether or not the mean value of the line transmission times calculated at step 152 is greater than or equal to a reference value for the mean value of the line transmission times. The reference value for the line transmission time mean value may be a value smaller than the reference value for the line transmission times. It may be 0.07 seconds or so, for example. If the determination is negative, the dummy electronic message receive interrupt process ends. On the other hand, if the determination is positive, a phenomenon that can cause failure is likely to have occurred in the computer system 10. Consequently, the process proceeds to step 156.

As described above, if any of the determinations at step 134, 138, 142, 146, 150, and 154 is positive, even though no failure has occurred in the computer system 10, a phenomenon that can cause failure in the computer system 10 has occurred in the computer system 10, such as a delay in processing due to line congestion or a bug encountered in a program being executed in the message broker 14 or the host computer 12, for example.

Therefore, a message indicating that there is a possibility of failure to the operator of the surveillance terminal is retrieved from the HDD (the message includes a message indicating which of the elapsed time t0, the mean elapsed time, the message broker 14 passing time, the mean message broker 14 passing time, the line transmission time, and the mean line transmission time is greater than or equal to its reference value). Then the process proceeds to step 158. At step 158, the message information retrieved at step 156 or 132 and the time information associated with the host computer 12 sending back the dummy message and stored in the past N cycles is sent to the surveillance terminal 28. Then the dummy electronic message receive interrupt process ends.

The reception of the information at the surveillance terminal 28 causes a message (a message indicating failure or a message indicating that there is a possibility of failure) represented by the message information to be displayed on the display of the surveillance terminal 28. This allows the operator to know the current status of the computer system 10 (that failure has occurred or that failure may occur).

Furthermore, if it is determined that failure can occur, a message is displayed on the display at the same time that indicates which of the elapsed time t0, the mean elapsed time, the message broker 14 passing time, the mean passing time, the line transmission time, and the mean line transmission time is greater than or equal to its reference value. By referring to this message, the operator can readily identify the location in which the phenomenon that can cause failure has occurred, and therefore can readily take corrective measures. This can prevent impairment of operations of the banking institution due to failure in the computer system 10.

Furthermore, the dummy electronic message receiving interrupt process described above is executed each time a dummy electronic message is received from the host computer 12. Therefore, if failure or a phenomenon that can cause failure occurs in any of the plurality of host computers 12, the operator can know that from a message displayed on the display. In the present embodiment, the time information sent to the surveillance terminal 28 can be displayed by the operator entering a command. The operator can refer to the time information to readily analyze a phenomenon that can cause failure.

While time information concerning the past N cycles is sent from the surveillance computer 26 to the surveillance terminal 28 when failure or a phenomenon that can cause failure has occurred in the example provided above, the present invention is not limited to this. Alternatively, the surveillance computer 26 may read the time information from the HDD and send it to the surveillance terminal 28 when it receives a command from the operator through the surveillance terminal 28, rather than sending time information to the surveillance terminal 28 regularly.

While the host computer 12 records time information only when processing a dummy electronic message in the example described above, the present invention is not limited to this. The host computer 12 may record the time information when it receives and sends the dummy electronic message.

As described above, according to the present invention, a dummy electronic message is sent at regular intervals from the surveillance computer to the processing computer through message broker and then sent back from the processing computer to the surveillance computer through the message broker, and at least in the message broker and the processing computer, time information representing the current time is recorded in the dummy electronic message at least when the dummy electronic message is received or sent or a process based on the dummy electronic message is performed and the time information in the dummy electronic message returned to the surveillance computer is recorded and the failure in the computer system is predicted on the basis of time elapsed between the transmission of the dummy electronic message from the surveillance computer and the reception of the dummy electronic message sent back at the surveillance computer and the mean elapsed time. Thus, the present invention has the advantage that the failure can be predicted.

The dummy electronic message in the present invention has the same format as that of electronic messages sent from terminals and a predetermined item of information is set in predetermined fields in the dummy electronic message. Thus, the present invention has, in addition to the advantage described above, the advantage that failure can be more reliably predicted.

The dummy electronic message is sent to each of the plurality of processing computers in the present invention. Thus the present invention has, in addition to those described above, the advantage that failure in each of a plurality of processing computers can be predicted.

The time elapsed between the transmission and reception of the dummy electronic message and the mean elapsed time in each of the segments between the surveillance computer and the message broker and between the message broker and the processing computer are also calculated, and the failure in the computer system is predicted by using the elapsed time and the mean elapsed time in each segment as well. Thus the present invention has the advantage that the failure in the computer system can be more reliably predicted.

The time information when the dummy electronic message is received at, and sent from, the message broker is recorded, the time elapsed between the reception and transmission of the dummy electronic message by the message broker and the mean elapsed time are calculated, and the elapsed time and the mean elapsed time are used to predict the failure in the computer system. Thus, the present invention has also the advantage that the failure can be more reliably predicted.

We claim:

1. A computer system comprising a processing computer for executing a predetermined process in response to an electronic message received from a terminal and for returning an electronic message to a sender of the original electronic message, a message broker for relaying electronic messages being transferred between said terminal and said processing computer, and a surveillance computer connected to said message broker via telecommunication circuit, said computer system further comprising:

a transmission means for periodically transmitting dummy electronic messages from said surveillance computer, said dummy electronic messages being transmitted from said surveillance computer to said processing computer via said message broker and then being returned from said processing computer to said surveillance computer via said message broker;

a recording means for marking a time information indicating a present time on a dummy electronic message at least one timing of receiving a dummy electronic message and/or transmitting a dummy electronic message and/or executing a process based on a dummy electronic message at least in said message broker and in said processing computer; and an error prediction means for making a storing means of said surveillance computer store time information marked on a dummy electronic message being returned to said surveillance computer from said processing computer via said message broker, and for predicting an error occurrence in said computer system based on a time to be required while a dummy electronic message having been transmitted from said surveillance computer returns to be received by said surveillance computer and a mean value of said required time.

2. The computer system according to claim 1, where said dummy electronic message has the same format as that of the electronic message sent from said terminal and a predetermined item of information is set in a predetermined field of said dummy electronic message.

3. The computer system according to claim 1, wherein a plurality of processing computers are provided as said processing computer and said transmission means sends said dummy electronic message to said plurality of processing computers.

4. The computer system according to claim 1, wherein said error prediction means calculates time elapsed between transmission of the dummy electronic message and reception of the dummy electronic message in each of the segments between said surveillance computer and said message broker and between said message broker and said processing computer and the mean elapsed time based on the time information stored in storage of said surveillance computer, and uses the calculated elapsed time and the mean elapsed time to predict an error occurrence in said computer system.

5. The computer system according to claim 4, wherein said recording means records time information in the dummy electronic message when the dummy message is received at and sent from said message broker; and said error prediction means calculates time elapsed between the reception of the dummy electronic message by said message broker and the transmission of the dummy electronic message by said message broker and the mean elapsed time and uses the elapsed time between the reception of the dummy electronic message by said message broker and the transmission time of the dummy electronic message by said message broker and the mean elapsed time to predict an error occurrence in said computer system.

* * * * *

UNITED STATES PATENT AND TRADEMARK OFFICE
CERTIFICATE OF CORRECTION

PATENT NO. : 6,896,179 B2  
APPLICATION NO. : 10/615437  
DATED : July 8, 2003  
INVENTOR(S) : Makoto Satoh et al.

It is certified that error appears in the above-identified patent and that said Letters Patent is hereby corrected as shown below:

Title page Item (73) should be corrected to read:

Assignee: International Business Machines Corporation, Armonk NY (US) and Bank of Tokyo-Mitsubishi, Tokyo (Japan)

Signed and Sealed this

Fourth Day of September, 2007

JON W. DUDAS  
*Director of the United States Patent and Trademark Office*

UNITED STATES PATENT AND TRADEMARK OFFICE
CERTIFICATE OF CORRECTION

| | |
|---|---|
| PATENT NO. | : 6,896,179 B2 |
| APPLICATION NO. | : 10/615437 |
| DATED | : May 24, 2005 |
| INVENTOR(S) | : Makoto Satoh et al. |

Page 1 of 1

It is certified that error appears in the above-identified patent and that said Letters Patent is hereby corrected as shown below:

Title page Item (73) should be corrected to read:

Assignee: International Business Machines Corporation, Armonk NY (US) and Bank of Tokyo-Mitsubishi, Tokyo (Japan)

This certificate supersedes Certificate of Correction issued September 4, 2007.

Signed and Sealed this

Ninth Day of October, 2007

JON W. DUDAS
*Director of the United States Patent and Trademark Office*